US009619186B2

(12) United States Patent
Webb et al.

(10) Patent No.: US 9,619,186 B2
(45) Date of Patent: Apr. 11, 2017

(54) CLOUD-BASED PRINTING FLUID SUBSCRIPTION MESSAGES

(71) Applicant: HEWLETT-PACKARD DEVELOPMENT COMPANY, L.P., Houston, TX (US)

(72) Inventors: Rowdy K. Webb, Portland, OR (US); Kerry J. Kilk, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/764,708

(22) PCT Filed: Jan. 31, 2013

(86) PCT No.: PCT/US2013/024234
§ 371 (c)(1),
(2) Date: Jul. 30, 2015

(87) PCT Pub. No.: WO2014/120229
PCT Pub. Date: Aug. 7, 2014

(65) Prior Publication Data
US 2015/0370515 A1    Dec. 24, 2015

(51) Int. Cl.
*G06F 3/12* (2006.01)
*G06Q 30/06* (2012.01)
*G06Q 10/08* (2012.01)

(52) U.S. Cl.
CPC .......... *G06F 3/1229* (2013.01); *G06F 3/1203* (2013.01); *G06F 3/1287* (2013.01);
(Continued)

(58) Field of Classification Search
None
See application file for complete search history.

(56) References Cited

U.S. PATENT DOCUMENTS 6,310,692 B1    10/2001    Fan et al.
6,382,762 B1    5/2002    Therien
(Continued)

FOREIGN PATENT DOCUMENTS

WO    WO-2012148400    11/2012
WO    WO-2014120229    8/2014

OTHER PUBLICATIONS

International Searching Authority, International Search Report and Written Opinion, issued in PCT/US2013/024234, mailed Oct. 29, 2013.

(Continued)

*Primary Examiner* — Huo Long Chen
(74) *Attorney, Agent, or Firm* — HP Inc. Patent Department

(57) ABSTRACT

Example embodiments relate to providing cloud-based printing fluid subscription messages. in example embodiments, the system may then calculate a fulfillment trigger value based on a printing fluid fill level of a printing fluid storage unit and a printing fluid usage history of a remote printing device, where the fulfillment trigger value describes a printing fluid used level of the printing fluid storage unit that triggers an order request for as replacement supply of printing fluid. Next, system may update a subscription fulfillment status for the remote printing device to an order triggered state and send the subscription fulfillment status to the remote printing device, where the remote printing device determines whether to display a printing fluid subscription message based on the subscription fulfillment status.

8 Claims, 5 Drawing Sheets

(52) U.S. Cl.
CPC ......... *G06F 3/1288* (2013.01); *G06Q 10/087* (2013.01); *G06Q 30/0613* (2013.01)

(56) References Cited

U.S. PATENT DOCUMENTS

| | | |
|---|---|---|
| 6,493,517 B1 | 12/2002 | Hanson |
| 6,985,877 B1 | 1/2006 | Hayward et al. |
| 7,216,951 B2 | 5/2007 | Garrana et al. |
| 7,344,215 B2 | 3/2008 | Cutler et al. |
| 7,433,607 B2 | 10/2008 | Thomas |
| 8,186,785 B1 | 5/2012 | Gold et al. |
| 8,271,348 B2 | 9/2012 | Rise et al. |
| 2002/0113991 A1 | 8/2002 | Borg et al. |
| 2003/0043401 A1 | 3/2003 | Abel et al. |
| 2005/0219284 A1 | 10/2005 | Shima |
| 2006/0228123 A1* | 10/2006 | Zaima ................ G03G 15/5079 399/24 |
| 2007/0188530 A1* | 8/2007 | Garrana ............... B41J 2/17533 347/7 |
| 2011/0188070 A1 | 8/2011 | Pala et al. |
| 2012/0027423 A1 | 2/2012 | Kawai |
| 2012/0303493 A1* | 11/2012 | Ishii ....................... G06Q 30/06 705/28 |

OTHER PUBLICATIONS

Refillable Epson Ink Cartridges (auto Reset), Retrieved from Internet Apr. 1, 2013, <http://www.inkbank.com.au/category79_1.htm>.
Spiceworks inc., "Spiceworks Automates $3 Billion in Printer Ink Purchasing for World's Largest Social Network of IT Professionals," Sep. 29, 2011, <http://www.spiceworks.com/news/press-release/2011/09-29/>.

* cited by examiner

CLOUD-BASED PRINTING FLUID SUBSCRIPTION MESSAGES

BACKGROUND

In some scenarios, a printing device may provide a low-on-fluid warning message when printing fluid levels are low in a printing fluid storage unit. The low-on-fluid message warns the user that the printing fluid storage unit may soon exhaust its printing fluid supply. The printing device may also provide a very low-in-fluid message to notify the user that the printing fluid storage unit should be changed.

BRIEF DESCRPTION OF THE DRAWINGS

The following detailed description references the drawings, wherein.

DETAILED DESCRIPTION

Figure 1:
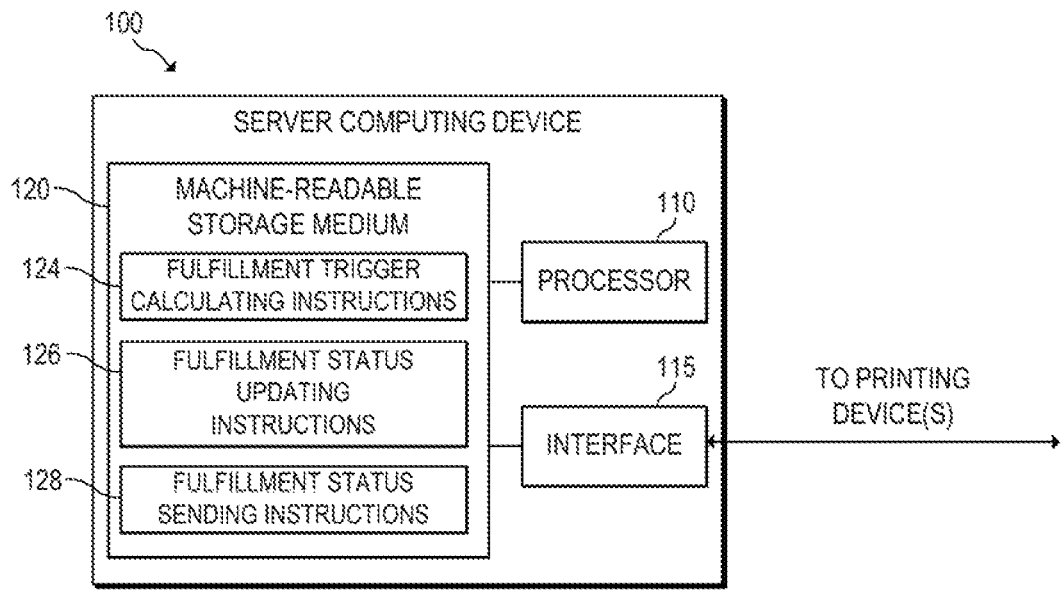
FIG. 1 is a block diagram of an example server computing device for providing cloud-based fulfillment status information of a printing fluid subscription.

As detailed above, printing devices provide printing fluid level warning messages to users. Specifically, a printing device may provide a low-on-fluid warning message and a very low-on-fluid warning message when preconfigured printing fluid levels are attained. For example, a printing device may provide a low-on-fluid warning message when a printing fluid storage unit is fifteen percent full and a very low-on-fluid warning message when the printing fluid storage unit is three percent full.

A printing fluid subscription may be purchased for a printing device, where replacement printing fluid storage units are provided for the printing device on a schedule. Ideally, the user may print without concern for purchasing replacement printing fluid storage units for the printing device because the replacements are provided automatically. In this case, the printing device is typically cloud-enabled so that subscription data may be provided to the printing device and so that the proper use of the replacement printing fluid storage units may be verified. However, even though subscription data is provided to the printing device, the subscription data may not be tailored to the specific printing device and its printing fluid usage history. As a result, the printing device may display unneeded printing fluid subscription messages.

Example embodiments disclosed herein address these issues by providing cloud-based printing fluid subscription messages that are based on a printing fluid usage history of the printing device and a subscription fulfillment status of a printing fluid subscription. For example, in some embodiments, a server computing device calculates a fulfillment trigger value based on a printing fluid fill level of a printing fluid storage unit and a printing fluid usage history of a remote printing device, where the fulfillment trigger value describes a first printing fluid used level of the printing fluid storage unit that triggers an order request for a replacement supply of printing fluid for the remote printing device. In response to determining that the fulfillment trigger value is exceeded, the server computing device updates a subscription fulfillment status for the remote printing device to an order triggered state, where the subscription fulfillment status describes an order status of the replacement supply of printing fluid. At this stage, the server computing device sends the subscription fulfillment status to the remote printing device, where the remote printing device determines whether to display a printing fluid subscription message based on the subscription fulfillment status.

In this manner, example embodiments disclosed herein prevent unneeded printing fluid subscription messages from being displayed on the remote printing device. Specifically, because the subscription fulfillment status is updated based on the printing fluid fill level and the printing fluid usage history of the remote printing device, the server computing device provides the remote printing device with more relevant printing fluid subscription updates that alleviate the need for printing fluid subscription messages. Further, because the subscription fulfillment status is updated based on print data received from the remote printing device, the time that the user of the remote printing device is in possession of multiple printing fluid storage units is minimized.

Referring now to the drawings, FIG. 1 is a block diagram of an example server computing device 100 for providing cloud-based fulfillment status information of a printing fluid subscription. Server computing device 100 may be any computing device accessible to a printing device, such as printing device 200 of FIG. 2. In the embodiment of FIG. 1, server computing device 100 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 124, 126, 128 to enable providing cloud-based fulfillment status information of a printing fluid subscription, as described below. As an alternative or in addition to retrieving and executing instructions, processor 110 may include one or more electronic circuits comprising a number of electronic components for performing the functionality of one or more of instructions 124, 126, 128.

Interface 115 may include a number of electronic components for communicating with a printing device. For example, interface 115 may be an Ethernet interface, a Universal Serial Bus (USB) interface, an IEEE 1394 (FireWire) interface, an external Serial Advanced Technology Attachment (eSATA) interface, or any other physical connection interface suitable for communication with the printing device. Alternatively, interface 115 may be a wireless interface, such as a wireless local area network (WLAN) interface or a near-field communication (NFC) interface. In operation, as detailed below, interface 115 may be used to send and receive data, such as a print data and subscription data, to and from a corresponding interface of a printing device.

Machine-readable storage medium 120 may be any electronic, magnetic, optical, or other physical storage device that stores executable instructions. Thus, machine-readable storage medium 120 may be, for example, Random Access Memory (RAM), Read-Only Memory (ROM), Electrically-Erasable Programmable Read-Only Memory (EEPROM), flash memory, a storage drive, an optical disc, and the like. As described in detail below, machine-readable storage medium 120 may be encoded with executable instructions for providing cloud-based fulfillment status information of a printing fluid subscription.

Fulfillment trigger calculating instructions 124 may calculate a fulfillment trigger for a printing fluid storage unit installed in a printing device based on the corresponding printing fluid fill level and printing fluid usage history received from the printing device. The fulfillment trigger may be calculated for printing devices that are associated with a printing fluid subscription so that replacement printing fluid may automatically be provided to the user of the printing device. In this case, the fulfillment trigger may describe the printing fluid used level of a printing fluid storage unit that triggers an order request for a replacement supply of printing fluid. The fulfillment trigger is calculated using the printing fluid fill level of the printing fluid storage unit and the printing fluid usage history. Because the printing fluid usage history is used, the fulfillment trigger is tailored to the usage patterns of the corresponding printing device.

Examples of printing fluid include, but are not limited to, ink and binding fluid. The printing fluid fill level of a printing fluid storage unit may describe the amount of printing fluid remaining in the printing fluid storage unit. Examples of printing fluid storage units may include, but are not limited to, inkjet cartridges, toner cartridges, solid printing fluid cartridges, binding fluid cartridges, etc. The printing fluid storage unit may include a sensor that is capable of detecting the amount of printing fluid remaining in the printing fluid storage unit. In this case, the printing fluid storage unit may also include an interface for providing its printing fluid fill level to the printing device.

The printing fluid usage history of a printing device may describe the amount of printing fluid used over time by the printing device. For example, printing fluid usage history may describe the amount of printing fluid used per day by a printing device after a printing fluid storage unit is originally installed. In another example, the printing fluid usage history may describe the exact amounts of printing fluid used with associated timestamps for each print job of the printing device.

In some cases, other factors may be considered in calculating the fulfillment trigger. For example, the fulfillment trigger may be adjusted to account for printing fluid loss resulting from water vapor transfer or for predicted hardware failures (e.g., predicted failure of print heads in a printing fluid storage unit). Considering additional factors in the calculation of the fulfillment trigger ensures that stale of failing printing fluid storage units are timely replaced regardless of their reported printing fluid fill levels.

Fulfillment trigger calculating instructions 124 may also calculate a trigger expected value. The trigger expected value describes a printing fluid used level of the printing fluid storage unit by which the order request for the replacement supply of printing fluid should be triggered by server computing device 100. For example, the trigger expected value may be calculated as the fulfillment trigger plus a portion of the printing fluid remaining after the fulfillment trigger is attained (e.g., determined using a preconfigured scalar). In this example, the trigger expected value is greater than the fulfillment trigger to provide a margin of error that accounts for delays in print data transmissions, order requests processing, subscription fulfillment updates, etc.

Fulfillment status updating instructions 120 may update the subscription fulfillment status of a printing fluid subscription based on the print data received from a printing device. The subscription fulfillment status describes the current order status of a replacement supply of printing fluid for a printing fluid subscription, where the printing fluid subscription is associated with a printing device and/or printing fluid storage unit(s). Possible states for the subscription fulfillment status of a printing fluid subscription may include, but are not limited to, an order triggered state, an order not triggered state, and a no plan to order state. The order triggered state indicates that a replacement supply of printing fluid has been ordered for the printing fluid subscription. The order not triggered state indicates that a replacement supply of printing fluid has not been ordered for the printing fluid subscription but that the replacement supply of printing fluid will be ordered when the fulfillment trigger is achieved. The no plan to order state indicates that there are no plans to order a replacement supply of printing fluid for the printing fluid subscription. For example, the subscription fulfillment status may be updated to a no plans to order a replacement supply if the initial printing fluid supply of a printing fluid subscription has not been installed in the printing device.

The subscription fulfillment status may be updated based on the order status of the printing fluid subscription. Initially, the subscription fulfillment status of a printing fluid subscription may be updated to a no plans to order state when an initial supply of printing fluid is ordered for an associated printing device. When the initial supply of printing fluid is installed in the printing device, the subscription fulfillment status may be updated to an order not triggered state. Next, when the current printing fluid used level of a printing fluid storage unit exceeds the fulfillment trigger, the subscription fulfillment status may be updated to an ordered triggered state when a replacement supply of printing fluid is ordered. At this stage, when the replacement supply of printing fluid is installed in the printing device, the subscription fulfillment status may be updated to an order not triggered state.

Fulfillment status sending instructions 128 may send the subscription fulfillment status of a printing fluid subscription to an associated printing device. In response to receiving the subscription fulfillment status, the printing device may provide cloud-based printing fluid subscription messages as discussed below with respect to FIGS. 2, 4B, and 5B. Server computing device 100 may then continue updating the subscription fulfillment status according to further print data received from the printing device.

Figure 2:
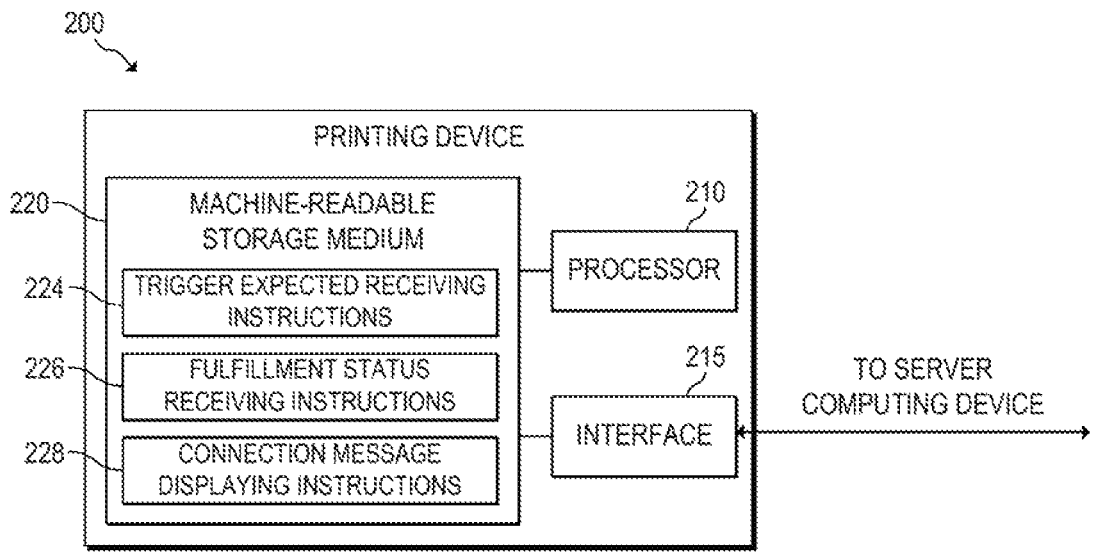
FIG. 2 is a block diagram of an example printing device far providing cloud-based printing fluid subscription messages.

FIG. 2 is a block diagram of an example printing device 200 for providing cloud-based printing fluid subscription messages based on subscription data received from a server computing device. Printing device 200 may be, for example, an inkjet printer, a laser printer, a solid printing fluid printer, an all-in-one printer, a snapshot printer, or any other printing device suitable for execution of the functionality described below. In the embodiment of FIG. 2, printing device 200 includes processor 210, interface 215, and machine-readable storage medium 220.

As with processor 110 of FIG. 1, processor 210 may be one or more CPUs, microprocessors, and/or other hardware devices suitable for retrieval and execution of instructions.

Processor 210 may fetch, decode, and execute instructions 224, 226, 228 to implement the providing cloud-based printing fluid subscription messages described below. Processor 210 may also or instead include electronic circuitry for performing the functionality of one or more instructions 224, 226, 228. As with interface 115 of FIG. 1, interface 215 may include electronic components for wired or wireless communication with server computing device. As described above, interface 215 may be in communication with a corresponding interface of server computing device to send or receive print data and subscription data. As with storage medium 120 of FIG. 1, machine-readable storage medium 220 may be any physical storage device that stores executable instructions.

Trigger expected receiving instructions 224 may receive and process a trigger expected value from a server computing device. As discussed above with respect to FIG. 1, the trigger expected value describes a printing fluid used level of a printing fluid storage unit installed in printing device 200 by which the order request for the replacement supply of printing fluid should be triggered by the server computing device. The trigger expected value may also be accompanied by a unique printing fluid device ID, which may be used by printing device 200 to identify the printing fluid storage unit. Trigger expected receiving instructions 224 may determine whether the current printing fluid used level of the printing fluid storage device exceeds the trigger expected value. If the current printing fluid used level exceeds the trigger expected value, a trigger exceeded notification may be provided to the connection message displaying instructions 228 for further processing. Trigger expected receiving instructions 224 may monitor the current printing fluid level so that the trigger exceeded notification may be generated when the printing fluid used level exceeds the trigger expected value. In this case, printing device 200 may be disconnected from the server computing device such that the trigger expected value that was last received by printing device 200 is used when monitoring the printing fluid used level.

Fulfillment status receiving instructions 226 may receive fulfillment status information from a server computing device. As discussed above with respect to FIG. 1, a subscription fulfillment status describes the current order status of a replacement supply of printing fluid for a printing fluid subscription associated with printing device 200. The printing fluid subscription may be managed by the server computing device, which requests that replacement supplies of printing fluid be delivered for use by printing device 200 based on the print data provided by the printing device 200. User of printing device 200 may have previously registered with the server computing device as discussed below with respect to FIGS. 5A and 5 below to initiate the printing fluid subscription. The subscription fulfillment status may be provided to the connection message displaying instructions 228 for further processing.

Connection message displaying instructions 228 may display a connection message on a display panel (hot shown) of printing device 200 based on the trigger expected value and the subscription fulfillment status. Specifically, the connection message may be displayed if a trigger exceeded notification has been received from trigger expected receiving instructions 224 and the subscription fulfillment status is set to an order not triggered state. The connection message may request that the user connect printing device 200 to the server computing device so that updated print data may be sent by the printing device 200. If the subscription fulfillment status is set to an order triggered state or a no plan to order state, no connection message may be displayed.

Figure 3:
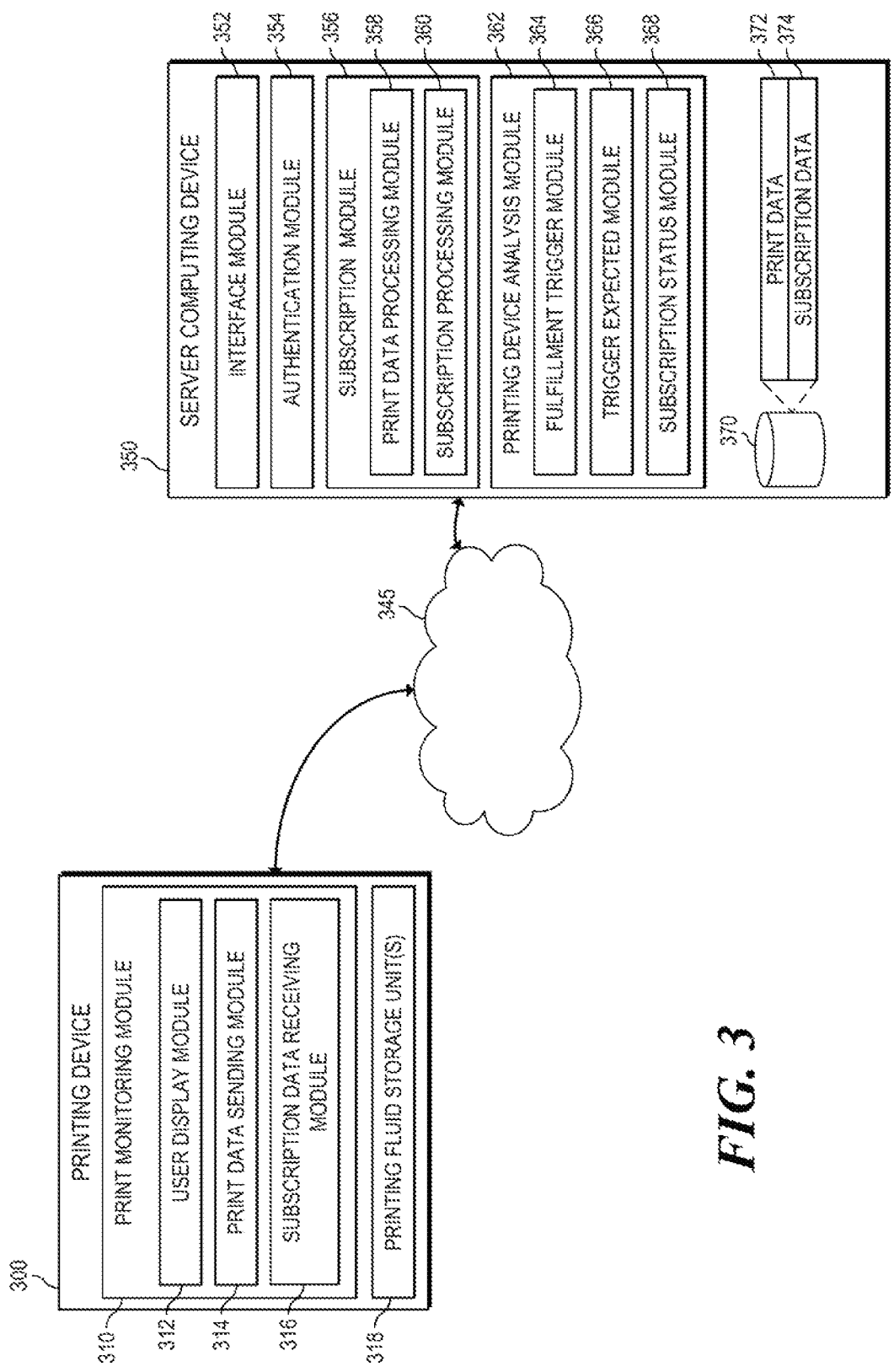
FIG. 3 is a block diagram of an example server computing device in communication with an example printing device for providing cloud-based printing fluid subscription messages.

FIG. 3 is a block diagram of an example server computing device 350 in communication via a network 345 with an example printing device 300. As illustrated in FIG. 3 and described below, server computing device 350 may communicate with printing device 300 to provide cloud-based printing fluid subscription messages.

As illustrated, printing device 300 may include a number of modules 310-316, while server computing device 350 may include a number of modules 352-368. Each of the modules may include a series of instructions encoded on a machine-readable storage medium and executable by a processor of the respective device 300, 350. In addition or as an alternative, each module may include one or more hardware devices including electronic circuitry for implementing the functionality described below.

As with printing device 200 of FIG. 2, printing device 300 may be an inkjet printer, a laser printer, a solid printing fluid printer, an all-in-one printer, a snapshot printer, or any other device suitable for executing the functionality described below. As detailed below, printing device 300 may include a series of modules 310-316 for providing cloud-based printing fluid subscription messages to a user.

Print monitoring module 310 may monitor the printing fluid storage unit(s) 318 and the printing activities of printing device 300. Although the components of print monitoring module 310 are described in detail below, additional details regarding an example implementation of module 310 are provided above with respect to instructions 224-228 of FIG. 2.

User display module 312 may display printing fluid subscription messages on a user display (not shown) of printing device 300. Examples of printing fluid subscription messages include, but are not limited to, a very low on printing fluid message, a connection message, a current printing fluid level message, etc. A connection message may instruct the user to establish or reestablish a connection between printing device 300 and server computing device 350. Further details regarding an example implementation of user display module 312 are provided above with respect to connection message displaying instructions 228 of FIG. 2.

Print data sending module 314 may collect and send print data to server computing device 350. Print data may include printing fluid fill level(s) of printing fluid storage unit(s) 318 and a printing fluid usage history. The printing fluid fill level(s) may be detected and provided by the printing fluid storage unit(s) 318 as discussed below. The printing fluid usage history may be generated by the print data sending module 314, which monitors printing activity of printing device 300. Specifically, the amount of printing fluid used as determined by printing fluid fill level(s) obtained from the printing fluid storage unit(s) as well as the time and duration of printing activity may he monitored to generate the printing fluid usage history. Print data may also include a unique print device ID associated with printing device 300 and unique printing fluid device ID(s) associated with the printing fluid storage unit(s) 318, which are stored in storage mediums of the respective devices.

The print data may be sent to server computing device 350 at regular intervals of time. For example, the print data sending module 314 may be configured to send print data to server computing device 350 hourly, daily, weekly, etc. In another example, the print data sending module 314 may be configured to send print data to server computing device 360 based on a quantity of pages printed by the printing device 300 (e.g., every ten printed pages, every fifty printed pages, ever hundred printed pages, etc.). In yet another example, the print data may be provided to server computing device 350 in real-time (i.e., as the print data is collected by the print data sending module 314).

Based on collected print data, print data sending module 314 may also request that user display module 312 display printing fluid subscription messages. For example, if the printing fluid fill level of a printing fluid storage unit is below a preconfigured threshold (e.g., three percent full), print data sending module 314 may request that user display module 312 display a very low on printing fluid message. In this example, the very low on printing fluid message may instruct the user may to replace the printing fluid storage unit.

Subscription data receiving module 316 may receive and process subscription data from server computing device 350. Subscription data may include a subscription fulfillment status and a trigger expected value as discussed above with respect to FIGS. 1 and 2. Subscription data may also include a request supply fulfillment trigger as discussed below with respect to fulfillment trigger module 364.

Based on the subscription data, subscription data receiving module 316 may request that user display module 312 display printing fluid subscription messages. For example, if the trigger expected value has beer exceeded by a printing fluid Ill level of a corresponding printing fluid storage unit 318 and the subscription fulfillment status is set to an order not triggered state, subscription data receiving module 316 may request that user display module 312 display a connection message. In another example, if the subscription fulfillment status is set to an order triggered state or a no plan to order state, subscription data receiving module 316 may refrain from requesting that user display module 312 display a printing fluid subscription message regardless of other factors. Further details regarding an example implementation of subscription data receiving module 316 are provided above with respect to trigger expected receiving instructions 224 and fulfillment status receiving instructions 226 of FIG. 2.

Based on the subscription data, subscription data receiving module 316 may initiate a transmission of print data to server computing device. For example, if the request supply fulfillment trigger is exceeded based on the printing fluid fill level of the printing fluid storage unit 318, subscription data receiving module 316 may request that print data sending module 314 immediately send updated print data to server computing device 350.

Printing fluid storage unit(s) 318 may store printing fluid to be used by printing device 300 for printing activities. Examples of printing fluid storage unit(s) 318 may include, but are not limited to, inkjet cartridges, toner cartridges, solid printing fluid cartridges, binding fluid cartridges, etc. Each printing fluid storage unit 318 may include a sensor configured to detect the amount of printing fluid remaining in the printing fluid storage unit 318 (i.e., printing fluid fill level). Printing fluid storage unit(s) 318 may provide printing fluid fill levels in response to requests received from the print data sending module 314.

As with server computing device 100 of FIG. 1, server computing device 350 may be any server accessible to printing device 300 over a network 345 (e.g., Internet, Intranet, local network, etc.) that is suitable for executing the functionality described below. As detailed below, server computing device 350 may include a series of modules 352-368 for providing cloud-based fulfillment status information to printing devices.

interface module 352 may manage communications with printing device 300. Specifically, interlace module 352 may initiate connections with printing device 300 and then send subscription data to or receive print data from printing device 300. Interface module 352 may also process credentials of printing device 300 to access server computing device 350. Specifically, interface module 352 may receive a unique print device ID from printing device 300 and request that authentication module 354 determine whether printing device 300 is properly registered for a printing fluid subscription. If the printing device 300 is properly registered, interface module 352 may then allow printing device 300 to communicate with the other modules of server computing device 350.

Subscription module 356 may manage subscription data for printing fluid subscriptions associated with printing devices 300. Although the components of subscription module 356 are described in detail below, additional details regarding an example implementation of subscription module 356 are provided above with respect to fulfillment status updating instructions 126 of FIG. 1.

Print data processing module 368 may receive and process print data from printing device 300. Print data may include a unique print device ID associated with printing device 300, a unique printing fluid device ID associated with the printing fluid storage unit 318, a printing fluid fill level of the printing fluid storage unit 318, and a printing fluid usage history of printing device 300. The unique print device ID may be used to identify the printing device that provided the print data. If printing device 300 is registered for a printing fluid subscription, the print data processing module 358 may store the print data 372 in the storage device 370. Alternatively, the print data processing module 358 may provide the print data 372 directly to the printing device analysis module 362 for further processing.

Subscription processing module 360 may update subscription data 374 in the storage device 370. Further, subscription processing module 360 may provide subscription data 374 to printing device 300 and printing device analysis module 362. More specifically, subscription processing module 360 may initiate order requests for replacement supplies of printing fluid and update the subscription fulfillment status for the printing fluid subscription in response to a request from the printing device analysis module 362. Possible states for the subscription fulfillment status of a printing fluid subscription may include an order triggered state, an order not triggered state, and a no plan to order state. For example, subscription processing module 360 may set the subscription fulfillment status to an order triggered state when requesting an order for a replacement supply of printing fluid. In this example, after the replacement supply of printing fluid is installed in printing device 300, subscription processing module 360 may set the subscription fulfillment status to an order not triggered state. In response to updating the subscription fulfillment status, subscription processing module 360 may send the subscription fulfillment status to printing device 300.

Printing device analysis module 362 may process print data received from printing device 300 to manage printing fluid subscriptions. Although the components of printing device analysis module 362 are described in detail below, additional details regarding an example implementation of printing device analysis module 362 are provided above with respect to fulfillment trigger calculating instructions 124 of FIG. 1.

Fulfillment trigger module 364 may calculate a fulfillment trigger for the printing fluid storage unit 318 based on print data provided by printing device 300. The fulfillment trigger may describe the printing fluid used level of the printing fluid storage unit 318 that triggers an order request for a replacement supply of printing fluid. The fulfillment trigger may then be calculated based on the printing fluid fill level of the printing fluid storage unit 318 and the printing fluid usage history of printing device 300. In this manner, the fulfillment trigger is tailored to the usage patterns of printing device 300 (i.e., greater printing activity results in lower fulfillment triggers).

Fulfillment trigger module 364 may also calculate a request supply fulfillment trigger for printing fluid storage unit 318 based on the fulfillment trigger and the printing fluid usage history. The request supply fulfillment trigger describes a printing fluid used level of the printing fluid storage unit by which printing device 300 should ensure that print data is being sent to server computing device 350. For example, the request supply fulfillment trigger may he calculated as the fulfillment trigger plus a portion of the printing fluid remaining after the fulfillment trigger is attained (e.g., determined using a preconfigured scalar).

Trigger expected module 366 may calculate a trigger expected value. The trigger expected value describes a printing fluid used level of the printing fluid storage unit 318 by which the order request for the replacement supply of printing fluid should be triggered by the subscription processing module 360. For example, the trigger expected value may be calculated as the fulfillment trigger plus a portion of the printing fluid remaining in the printing fluid storage unit 318 after the fulfillment trigger is attained (e.g., determined using a preconfigured scalar). The trigger expected module 366 may provide the trigger expected value to the subscription processing module 360 so that it can be sent to printing device 300.

Subscription status module 368 may process the print data 372 in view of the fulfillment trigger to generate requests for the subscription processing module 360. For example, if the printing fluid used level of printing fluid storage unit 318 exceeds the fulfillment trigger and the subscription fulfillment status is set to an order not triggered state, the subscription status module 368 may request that the subscription processing module 360 order a replacement supply of printing fluid and update the subscription fulfillment status to an order triggered state.

Storage device 370 may be any hardware storage device for maintaining data accessible to server computing device 350. For example, storage device 370 may include one or more hard disk drives, solid state drives, tape drives, and/or any other storage devices. The storage devices may be located in server computing device 350 and/or in another device in communication with server computing device 350. As detailed above, storage device 370 may maintain print data 372 and subscription data 374.

Figures 4A, 4B:
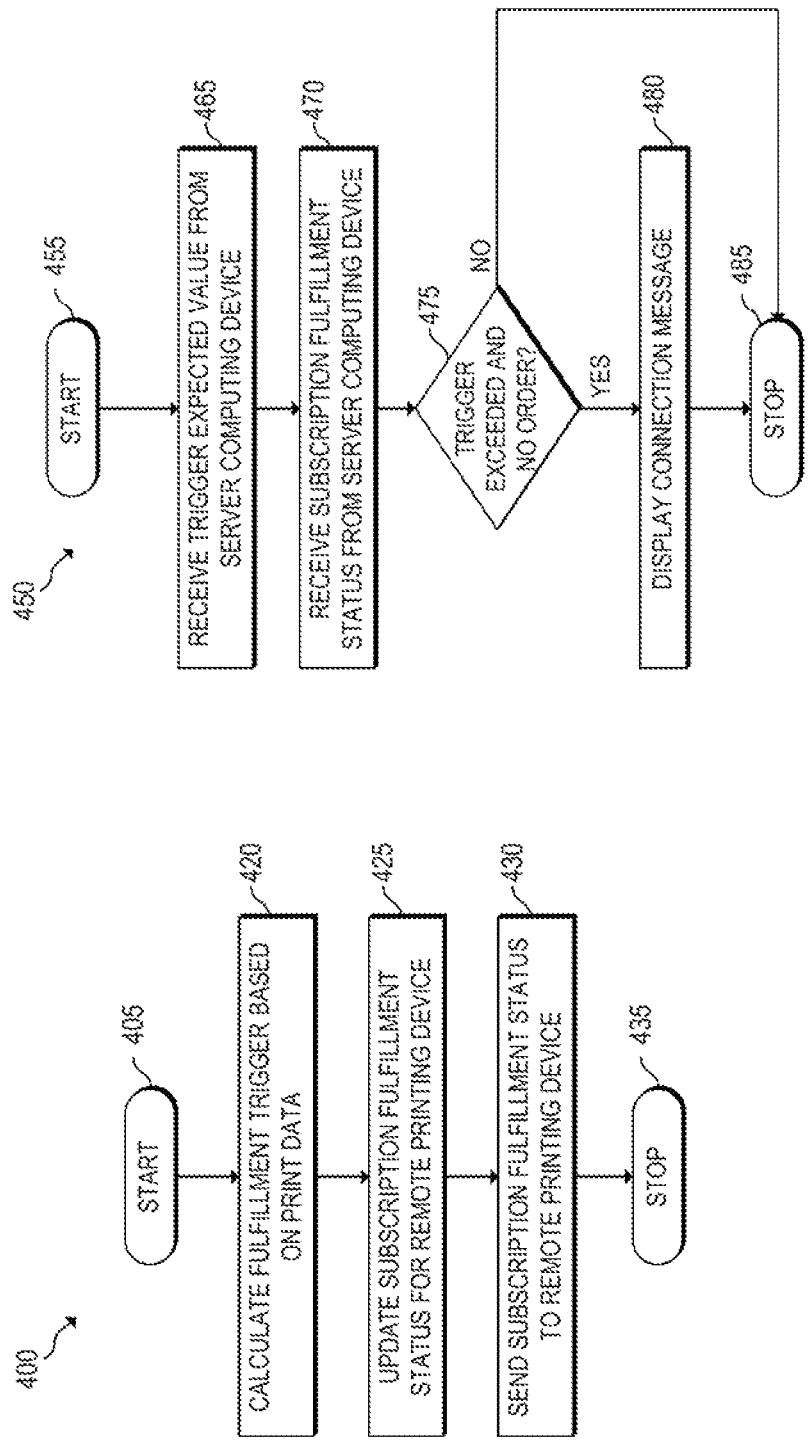
FIG. 4A is a flowchart of an example method for execution by a server computing device for providing cloud-based fulfillment status information of a printing fluid subscription.
FIG. 4B is a flowchart of an example method for execution by a printing device for providing cloud-based printing fluid subscription messages.

FIG. 4A is a flowchart of an example method 400 for execution by server computing device 100 for providing cloud-based fulfillment status information of a printing fluid subscription to a printing device. Although execution of method 400 is described below with reference to server computing device 100 of FIG. 1, other suitable devices for execution of method 400 may be used, such as server computing device 350 of FIG. 3. Method 400 may be implemented in the form of executable instructions stored on a machine-readable storage medium, such as storage medium 120, and/or in the form of electronic circuitry.

Method 400 may start in block 405 and continue to block 420, where server computing device 100 may calculate a fulfillment trigger based on print data from a remote printing device. For example, the fulfillment trigger may be calculated based on a printing fluid fill level of a printing fluid storage unit and a printing fluid usage history of the remote printing device.

In block 425, server computing device 100 may update the subscription fulfillment status for the remote printing device using the fulfillment trigger. Specifically, if the printing fluid used level of the printing fluid storage unit exceeds the fulfillment trigger, a replacement supply of printing fluid may be ordered for the remote printing device, and the subscription fulfillment status may be updated to an order triggered state. Next, in block 430, server computing device 100 may send the subscription fulfillment status to the printing device. Method 400 may then continue to block 435, where method 400 may stop.

FIG. 4B is a flowchart of an example method 450 for execution by printing device 200 for providing cloud-based printing fluid subscription messages. Although execution of method 450 is described below with reference to printing device 200 of FIG. 2, other suitable devices for execution of method 450 may be used, such as printing device 300 of FIG. 3. Method 450 may be implemented in the form of executable instructions stored on a machine-readable storage medium, such as storage medium 220, and/or in the form of electronic circuitry.

Method 450 may start in block 455 and proceed to block 465, where printing device 200 may receive a trigger expected value from the server computing device. The trigger expected value describes a printing fluid used level of the printing fluid storage unit by which an order request for a replacement supply of printing fluid should be triggered by the server computing device, where printing device 200 may send print data to the server computing device. Further, the trigger expected value may be calculated by the server computing device using a printing fluid fill level of a printing fluid storage unit and a printing fluid usage history of printing device 200. In block 470, printing device 200 may receive a subscription fulfillment status from the server computing device. The subscription fulfillment status describes the current order status of a replacement supply of printing fluid for a printing fluid subscription, where the printing fluid subscription is associated with the printing fluid storage unit of printing device 200.

In block 475, printing device 200 determines if the trigger expected value is exceeded by the printing fluid used level of the printing fluid storage device and if the subscription fulfillment status is set to an order not triggered state. If the trigger expected value is exceeded and the subscription fulfillment status is set to the order not triggered state, method 450 may proceed to block 480, where a connection message is displayed on printing device 200. The connection message may instruct the user to ensure that printing device 200 is connected to a network so that it can communicate with the server computing device. Method 450 may then continue to block 485, where method 450 may stop. Alternatively, if the trigger expected value is not exceeded or if the subscription fulfillment status is set to a state other than an order not triggered state, method 450 may skip directly to block 485, where method 450 may stop.

Figure 5A:
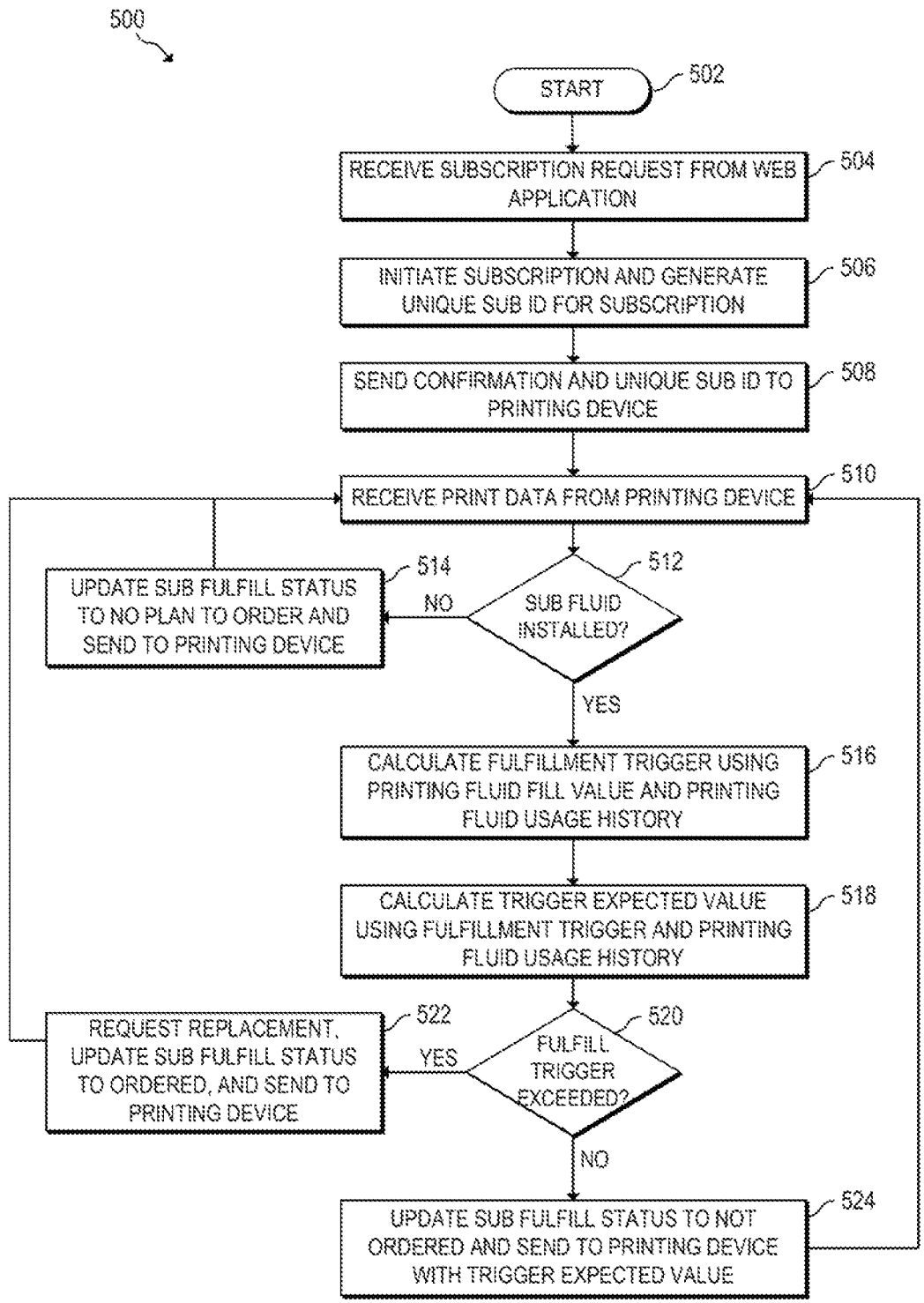
FIG. 5A is a flowchart of an example method for execution by a server computing device for managing a cloud-based printing fluid subscription.

FIG. 5A is a flowchart of an example method 500 for execution by server computing device 350 for managing a cloud-based printing fluid subscription of printing device 300. Although execution of method 500 is described below with reference to server computing device 350 of FIG. 3, other suitable devices for execution of method 500 may be used. Method 500 may be implemented in the form of executable instructions stored on a machine-readable storage medium and/or in the form of electronic circuitry.

Method 500 may start in block 502 and proceed to block 504, where server computing device 350 may receive a subscription request from a user of printing device 300. The user may submit the subscription request using a web application configured to display a user interface for collecting subscription registration information. The subscription request may include a unique ID associated with printing device 300 (e.g., a unique print device ID for printing device 300, a unique account ID for a print web service that is associated with printing device 300, etc.), payment information, and a request to initiate a printing fluid subscription for printing device 300.

Next, in block 506, server computing device 350 may initiate a printing fluid subscription for printing device 300, where a unique subscription ID is generated for the printing fluid subscription. To initiate the printing fluid subscription, an initial supply of printing fluid may be ordered for delivery to the user of printing device 300, and a subscription fulfillment status of the printing fluid subscription may be set to a no plan to order state. The subscription fulfillment status describes the current order status of a replacement supply of printing fluid for the printing fluid subscription associated with printing device 300. The no plan to order state indicates that server computing device 350 has no plans to order a replacement supply of printing fluid for the printing fluid subscription until the user installs the initial supply of printing fluid in printing device 300. The printing fluid subscription may also be associated with a subscription status that describes a current status (e.g., active, inactive, suspended, etc.) of the printing fluid subscription. The server computing device 350 may user the subscription status to determine if the printing fluid subscription is active before ordering replacement supplies of printing fluid.

In block 508, server computing device 350 may send confirmation of the initiation of the printing fluid subscription and the unique subscription ID to printing device 300. The confirmation may notify printing device 300 that the initial supply of printing fluid is being processed for delivery. Further, the unique subscription ID may be used by printing device 300 to authorize use of supplies of printing fluid received from the printing fluid subscription (i.e., printing device 300 is authorized to use subscription printing fluid supplies because it has access to the unique subscription ID). In block 510, print data is received by server computing device 350 from printing device 300. The print data may include a unique print device ID associated with printing device 300, a unique printing fluid device ID associated with a printing fluid storage unit installed in printing device 300, a printing fluid fill level of the printing fluid storage unit, a printing fluid usage history of printing device 300, and the unique subscription ID.

At this stage in block 512, server computing device 350 determines if the last supply of replacement printing fluid for the printing fluid subscription has been installed in printing device 300. If the last supply of replacement printing fluid has not been installed, server computing device 350 may update the subscription fulfillment status to the no plan to order state and send the subscription fulfillment status to printing device 300 in block 514. Method 300 may then return to block 510, where updated print data is received by server computing device 350 from printing device 300.

If the last supply of replacement printing fluid has been installed, server computing device 350 may calculate a fulfillment trigger using the printing fluid fill value of the printing fluid storage device and the printing fluid usage history of printing device 300 in block 516. The fulfillment trigger may describe the printing fluid used level of the printing fluid storage unit that triggers an order request for a replacement supply of printing fluid by server computing device 350. As discussed above, other factors (e.g., water vapor transfer, predicted hardware failure, etc.) may be accounted for in the calculation of the fulfillment trigger. Accounting for other facts ensures that stale or failing printing fluid storage units are timely replaced regardless of their reported printing fluid fill levels.

In block 518, server computing device 350 may calculate a trigger expected value using the fulfillment trigger and the print data received in block 510. The trigger expected value describes a printing fluid used level of the printing fluid storage unit by which the order request for the replacement supply of printing fluid should be triggered by server computing device 350.

Next, in block 520, server computing device 350 determines if the fulfillment trigger is exceeded by a printing fluid used level of the printing fluid storage unit installed in printing device 300. If the fulfillment trigger is exceeded, server computing device 350 generates an order request for a replacement supply of printing fluid for the printing fluid subscription, updates the subscription fulfillment status to an order triggered state, and sends the updated subscription fulfillment status to printing device 300 in block 522. The order triggered state indicates that the replacement supply of printing fluid has been ordered by server computing device 350. Method 500 may then return to block 510, where updated print data is received by server computing device 350 from printing device 300.

If the fulfillment trigger is not exceeded, server computing device 350 updates the subscription fulfillment status to an order not triggered state and sends the updated subscription fulfillment status and the trigger expected value to printing device 300. The order not triggered state indicates that the replacement supply of printing fluid has not been ordered by server computing device 350. Method 500 may continue as described above until the printing fluid subscription is terminated by the user of printing device 300.

Figure 5B:
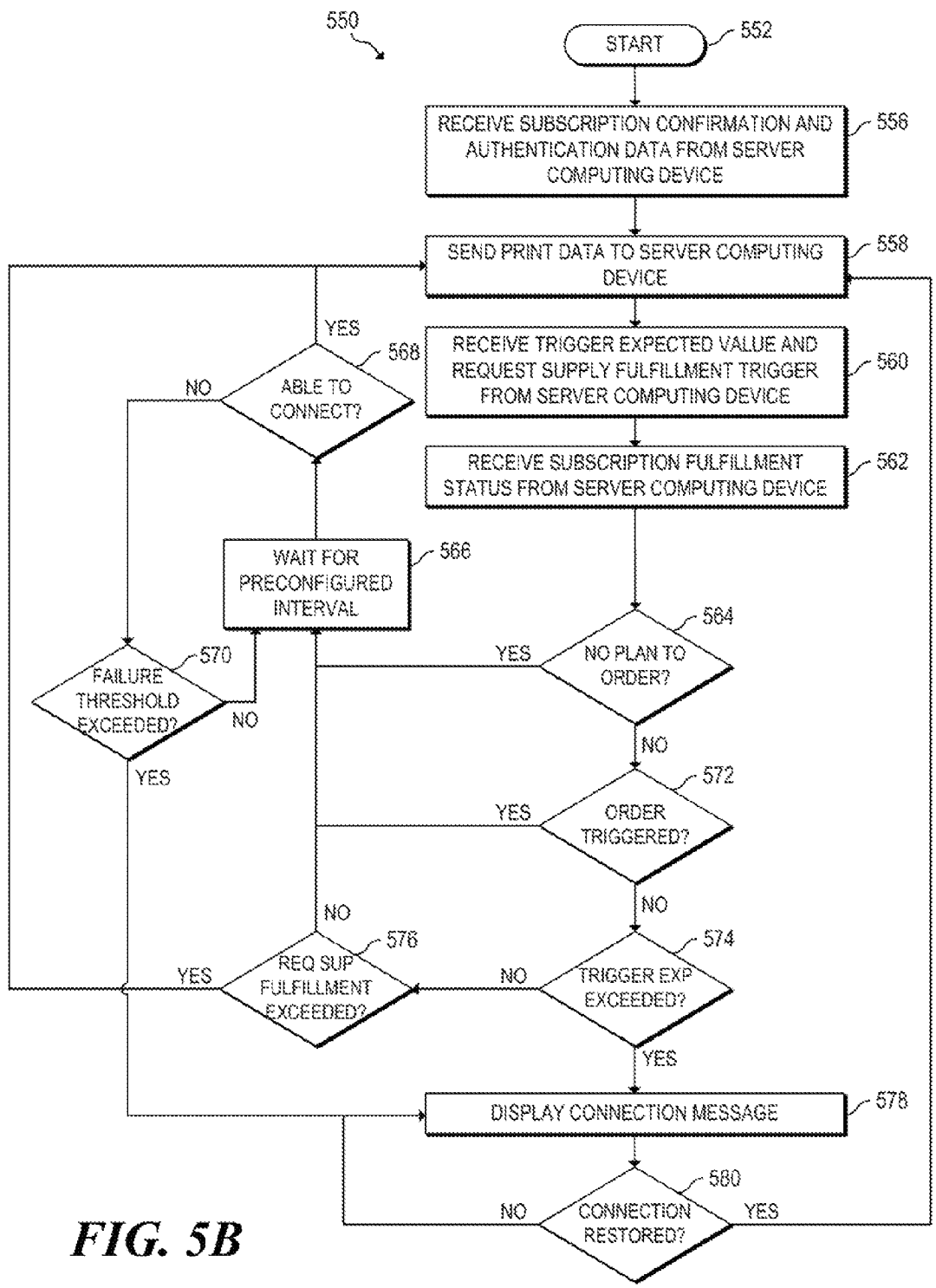
FIG. 5B is a flowchart of an example method for execution by a printing device for providing cloud-based printing fluid subscription messages.

FIG. 5B is a flowchart of an example method 550 for execution by printing device 300 for providing cloud-based printing fluid subscription messages. Although execution of method 500 is described below with reference to printing device 300 of FIG. 3, other suitable devices for execution of method 550 may be used. Method 550 may be implemented in the form of executable instructions stored on a machine-readable storage medium and/or in the form of electronic circuitry.

Method 550 may start in block 552 and proceed to block 554, where printing device 300 printing fluid may receive confirmation of the initiation of the printing fluid subscription and a unique subscription ID from server computing device 350. The confirmation may notify printing device 300 that the initial supply of printing fluid is being processed for delivery. Further, as discussed above, printing device 300 may be authorized to use the initial supply of printing fluid because it has access to the unique subscription ID. Server computing device 350 may have initiated the printing fluid subscription in response to a subscription request received from the user via a web application.

Next, in block 558, print data is sent by printing device 300 to server computing device 350. The print data may include a unique print device ID associated with printing device 300, a unique printing fluid device ID associated with a printing fluid storage unit installed in printing device 300, a printing fluid fill level of the printing fluid storage unit, printing fluid usage history of printing device 300, and the unique subscription ID.

In block 560, a trigger expected value and a request supply fulfillment trigger are received by printing device no from server computing device 350. The trigger expected value describes a printing fluid used level of the printing fluid storage unit by which the order request for the replacement supply of printing fluid should be triggered by the server computing device 350. The request supply fulfillment trigger describes a printing fluid used level of the printing fluid storage unit by which printing device 300 should ensure that print data is being sent to server computing device 350. In block 562, a subscription fulfillment status is received by printing device 300 from server computing device 350. The subscription fulfillment status describes the current order status of a replacement supply of printing fluid for the printing fluid subscription associated with printing device 300.

Next, in block 564, printing device 300 determines if the subscription fulfillment status is set to a no plan to order state. The no plan to order state indicates that server computing device 350 has no plans to order a replacement supply of printing fluid for the printing fluid subscription until the user installs the initial supply of printing fluid in printing device 300. If the subscription fulfillment status is set to the no plans to order state, printing device 300 may suspend the transmission of print data for a preconfigured interval (e.g., a set number of hours, days, weeks, etc.) in block 566. After the preconfigured interval has passed, printing device 300 may resume the transmission of print data in block 558.

If the subscription fulfillment status is not set to the no plans to order state, printing device 300 determines if the subscription fulfillment status is set to an order triggered state in block 572. The order triggered state indicates that a replacement supply of printing fluid has been ordered by server computing device 350. If the subscription fulfillment status is set to the order triggered state, printing device 300 wait for a preconfigured interval in block 566. The preconfigured interval may be a time-based interval (e.g., hours, days, weeks, etc.) or a page-based interval (e.g., ten printed pages, fifty printed pages, a hundred printed pages, etc.).

After the preconfigured interval has passed, printing device 300 may determine if it is able to connect to server computing device 350 in block 568. If printing device 300 is able to connect to server computing device 350, printing device 300 may resume the transmission of print data in block 558. If printing device 300 is unable to connect to server computing device 350, printing device 300 may determine if a connection failure threshold is exceeded in block 570. Specifically, printing device 300 may determine that the connection threshold is exceeded if printing device 300 is unable to connect to server computing device 350 after a set number of consecutive attempts.

It the connection failure threshold has not been exceeded, method 550 may return to block 566, where printing device 300 waits for another preconfigured interval. If the connection failure threshold has been exceeded, method may proceed to block 578, where a connection message is displayed. The connection message may instruct the user of the printing device 300 to ensure that printing device 300 is properly connected to sewer computing device 350. In block 580, printing device 300 may determine if a connection has been established with the server computing device 350. If the connection has been established, method 550 may return to block 558, where printing device 300 sends updated print data to server computing device 350.

If the subscription fulfillment status is not set to the order triggered state, printing device 300 determines if the trigger expected value has been exceeded by the printing fluid used level of the printing fluid storage device in block 574. if the trigger expected value has not been exceeded, printing device 300 may determine if the request supply fulfillment trigger is exceeded in block 576. if the request supply fulfillment trigger is not exceeded, method 550 may proceed to blocks 566-570 as discussed above. If the request supply fulfillment trigger is exceeded, method 550 may proceed to directly to block 558, where updated print data is sent to server computing device 350 immediately.

At this stage, if the trigger expected value has been exceeded, printing device 300 may display a connection message in block 578. The connection message may request that the user connect printing device 300 to server computing device 350 so that updated print data may be transmitted. In block 580, printing device 300 may determine if a connection has been established with the server computing device 350. If the connection has been established, method 550 may return to block 558, where printing device 300 sends updated print data to server computing device 350.

If the connection has not been established, method 550 may return to block 572, where printing device 300 displays the connection message again. Method 550 may continue as described above until the printing fluid subscription is terminated by the user of printing device 300.

The foregoing disclosure describes a number of example embodiments for providing cloud-based printing fluid subscription messages by a printing device and a server computing device. In this manner, the embodiments disclosed herein enable providing cloud-based printing fluid subscription messages by determining printing fluid subscription messages based on printing fluid usage history of the printing device and a subscription fulfillment status of a printing fluid subscription managed by the server computing device.

We claim:

1. A system for cloud-based printing fluid subscription messages, the system comprising:
   a processor;
   a printing device analysis module to:
      calculate a fulfillment trigger value based on a printing fluid fill level of a printing fluid storage unit and a printing fluid usage history of a remote printing device, wherein the fulfillment trigger value describes a first printing fluid used level of the printing fluid storage unit that triggers an order request for a replacement supply of printing fluid for the remote printing device;
      in response to determining that the fulfillment trigger value is exceeded, update a subscription fulfillment status for the remote printing device to an order triggered state, wherein the subscription fulfillment status describes an order status of the replacement supply of printing fluid;
      send the subscription fulfillment status to the remote printing device, wherein the remote printing device determines whether to display a printing fluid subscription message based on the subscription fulfillment status;
      calculate a trigger expected value based on the fulfillment trigger value and the printing fluid usage history, wherein the trigger expected value describes a second printing fluid used level of the printing fluid storage unit by which the order request for the replacement supply of printing fluid should be triggered, and send the trigger expected value to the remote printing device, wherein the remote printing device displays a connection message in response to determining that the trigger expected value is exceeded and that the subscription fulfillment status is updated to an order not triggered state.

2. The system of claim 1, wherein the printing device analysis module is to:
receive a printing fluid subscription registration request;
generate a unique subscription identifier for the remote printing device;
update a subscription status for the remote printing device, wherein the subscription status indicates whether the remote printing device is registered for a printing fluid subscription; and
request that an initial supply of printing fluid be delivered for the remote printing device, wherein the initial supply of printing fluid is associated with the unique subscription identifier.

3. The system of claim 2, wherein the printing device analysis module-processor is further to:
update the subscription fulfillment status for the remote printing device to a no plan to order state, wherein the no plan to order state indicates that the order request for the replacement supply of printing fluid will not be triggered;
receive a notification that the initial supply of printing fluid is installed in the remote printing device; and
update the subscription fulfillment status for the remote printing device to the order not triggered state.

4. The system of claim 1, wherein the printing device analysis module is to:
calculate a request supply fulfillment trigger value based on the fulfillment trigger and the printing fluid usage history, wherein the request supply fulfillment trigger value describes a second printing fluid used level of the printing fluid storage unit that triggers a transmission of updated print data by the remote printing device; and
send the request supply fulfillment trigger value to the remote printing device, wherein the remote printing device transmits the updated print data in response to determining that the request supply fulfillment trigger value is exceeded.

5. A method for cloud-based printing fluid subscription messages on a computing device, the method comprising:
calculating a fulfillment trigger value based on a printing fluid fill level of a printing fluid storage unit and a printing fluid usage history of a remote printing device, wherein the fulfillment trigger value describes a first printing fluid used level of the printing fluid storage unit that triggers an order request for a replacement supply of printing fluid for the remote printing device;
in response to determining that the fulfillment trigger value is exceeded, updating a subscription fulfillment status for the remote printing device to an order triggered state, wherein the subscription fulfillment status describes an order status of the replacement supply of printing fluid;
sending the subscription fulfillment status to the remote printing device, wherein the remote printing device determines whether to display a printing fluid subscription message based on the subscription fulfillment status;
calculating a trigger expected value based on the fulfillment trigger value and the printing fluid usage history, wherein the trigger expected value describes a second printing fluid used level of the printing fluid storage unit by which the order request for the replacement supply of printing fluid should be triggered; and
sending the trigger expected value to the remote printing device, wherein the remote printing device displays a connection message in response to determining that the trigger expected value is exceeded and that the subscription fulfillment status is updated to an order not triggered state.

6. The method of claim 5, wherein the processor is further to:
receiving a printing fluid subscription registration request from the remote printing device;
generating the unique device identifier for the remote printing device;
updating a subscription status for the remote printing device, wherein the subscription status indicates whether the remote printing device is registered for a printing fluid subscription; and
requesting that an initial supply of printing fluid be delivered for the remote printing device, wherein the initial supply of printing fluid is associated with a unique subscription identifier.

7. The method of claim 6, further comprising:
updating the subscription fulfillment status for the remote printing device to a no plan to order state, wherein the no plan to order state indicates that the order request for the replacement supply of printing fluid will not be triggered;
receiving a notification that the initial supply of printing fluid is installed in the remote printing device; and
updating the subscription fulfillment status for the remote printing device to the order not triggered state.

8. The method of claim 5, further comprising:
calculating a request supply fulfillment trigger value based on the fulfillment trigger and the printing fluid usage history, wherein the request supply fulfillment trigger value describes a second printing fluid used level of the printing fluid storage unit that triggers a transmission of updated print data by the remote printing device; and
sending the request supply fulfillment trigger value to the remote printing device, wherein the remote printing device transmits the updated print data in response to determining that the request supply fulfillment trigger value is exceeded.

* * * * *